United States Patent [19]

Larsen

[11] Patent Number: 5,607,123
[45] Date of Patent: Mar. 4, 1997

[54] ACTUATION SYSTEM WITH PASSIVE COMPENSATION FOR TRANSIENT LOADS

[75] Inventor: Richard K. Larsen, Lahambra, Calif.

[73] Assignee: AlliedSignal Inc., Morris Township, N.J.

[21] Appl. No.: 269,813

[22] Filed: Jun. 30, 1994

[51] Int. Cl.⁶ .................................................... B64C 15/02
[52] U.S. Cl. ............................................. 244/52; 244/172
[58] Field of Search ........................ 244/52, 172, 75 R; 74/89.15; 318/566, 623

[56] References Cited

U.S. PATENT DOCUMENTS

| | | |
|---|---|---|
| 2,621,005 | 12/1952 | Turpin . |
| 3,130,947 | 4/1964 | Franks . |
| 3,159,968 | 12/1964 | Welles ........................................ 60/228 |
| 3,456,172 | 7/1969 | Hendrik et al. . |
| 3,477,665 | 11/1969 | Legrand .............................. 244/17.23 |
| 3,549,107 | 12/1970 | Zimmer . |
| 3,568,929 | 3/1971 | Butter . |
| 3,634,746 | 1/1973 | Strege . |
| 3,957,260 | 5/1976 | Raymond et al. . |
| 3,984,071 | 10/1976 | Fleming . |
| 4,143,583 | 3/1979 | Bauer et al. . |
| 4,282,979 | 8/1981 | Friedrichs . |
| 4,355,358 | 10/1982 | Chelford et al. . |
| 4,396,171 | 8/1983 | Schultz . |
| 4,796,192 | 1/1989 | Lewis . |
| 4,864,882 | 9/1989 | Capewell .............................. 244/75 R |
| 4,913,379 | 4/1990 | Kubota et al. . |
| 5,115,710 | 5/1992 | Mitchell et al. ........................ 244/172 |

OTHER PUBLICATIONS

H 1381, Leauff et al, Pub Dec. 6, 1994 filed Mar. 14, 1991.

Primary Examiner—Galen L. Barefoot
Attorney, Agent, or Firm—John R. Rafter

[57] ABSTRACT

A thrust-vectoring actuation system for rocket nozzles in provided with force attenuation means in order to limit transient loads which the nozzle and associated structure experience during engine startup and shutdown.

4 Claims, 3 Drawing Sheets

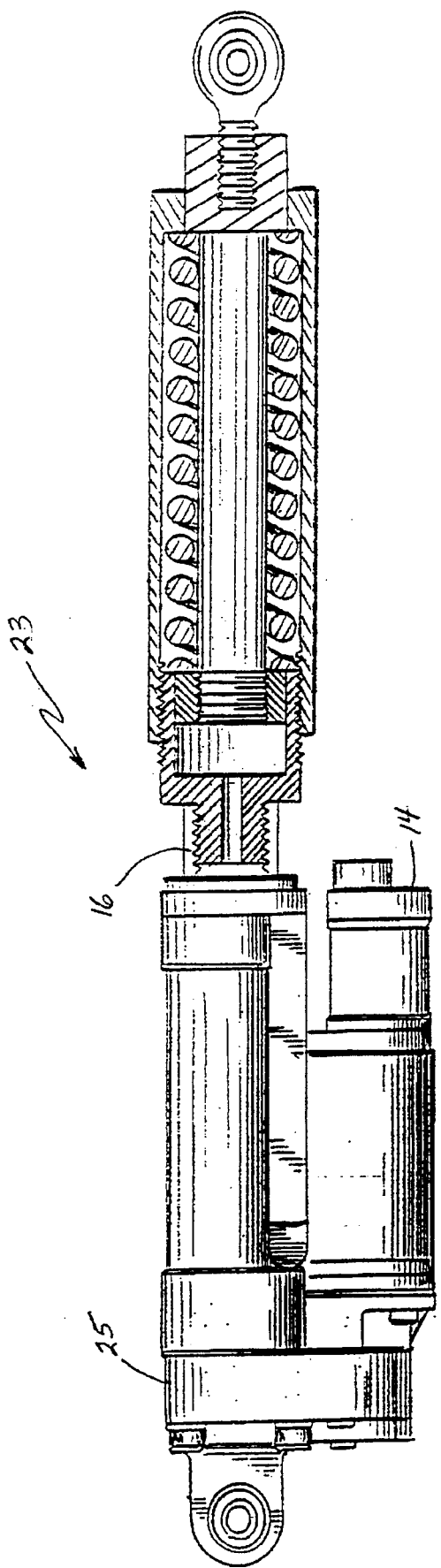
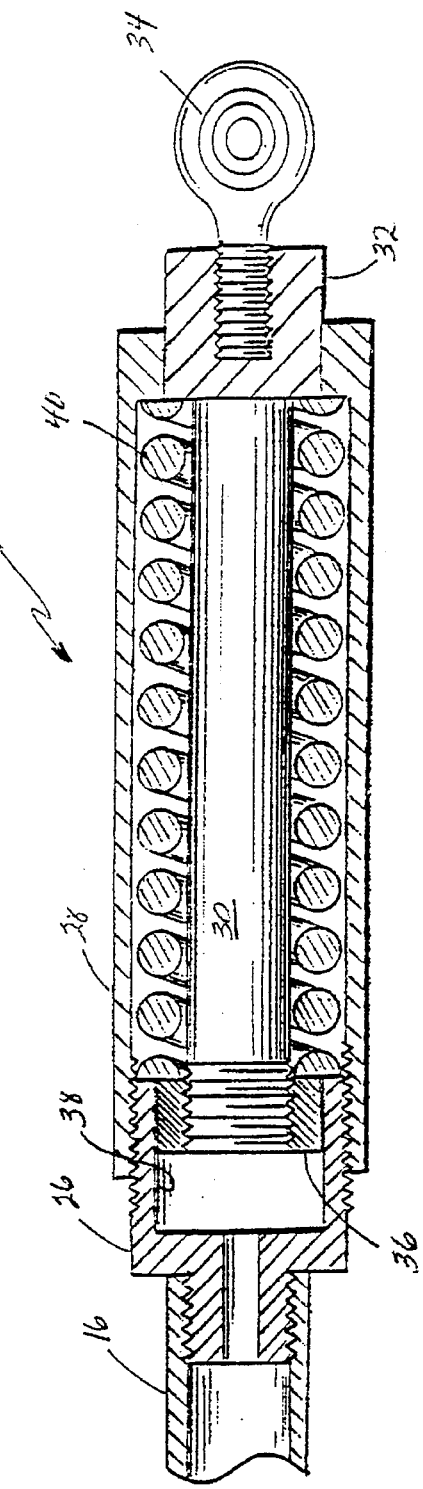

5,607,123

ACTUATION SYSTEM WITH PASSIVE COMPENSATION FOR TRANSIENT LOADS

TECHNICAL FIELD

The present invention relates generally to thrust-vectoring actuation systems for rocket nozzles.

BACKGROUND OF THE INVENTION

It has been observed that thrust-vectoring actuation (TVA) systems for rockets are subjected to transient loads which accompany the startup and shutdown of rocket engines. These loads, which are transferred to the nozzle structure of the rocket via the TVA system, are unpredictablie in terms of both amplitude and direction. However, the loads are sufficiently strong to raise concern about the possibility that they could exceed the operational loads for which the nozzle and associated structure are designed. In that event, the nozzle structure could yield under the influence of such loads, thereby putting the nozzle in an out-of-round condition.

The above-described loads are cyclic, having frequencies which vary with the particular rocket in question. Available data indicate, for example, that the frequency can vary from about 4 Hz on the Centaur to about 12 Hz on the Titan IV.

An object of this invention is to provide a compliant TVA system that will absorb transient loads which exceed operational loads, and that will do so sufficiently to prevent deformation of the rocket nozzle or associated structure.

SUMMARY OF THE INVENTION

The invention provides a thrust-vectoring actuation system for positioning a rocket nozzle, and comprises in combination: a first bi-directional electric motor including a first output shaft connected to the nozzle; the shaft extending in a first direction; a second bi-directional electric motor including a second output shaft connected to the nozzle; the second shaft extending in a second direction perpendicular to the first direction; first shock-absorption means connected between the first shaft and the nozzle for permitting relative movement in response to transient force applied in the first direction; and second shock-absorption means for permitting relative movement between the second shaft and the nozzle in response to transient force applied in the second direction.

DESCRIPTION OF THE DRAWINGS

FIG. 4 is a partially elevational and partially cross-sectional view of the bi-directional motor and shock absorber combination illustrated in FIG. 3.

FIG. 5 is an enlargement of a portion of FIG. 4.

DESCRIPTION OF THE PREFERRED EMBODIMENT

Figure 1:
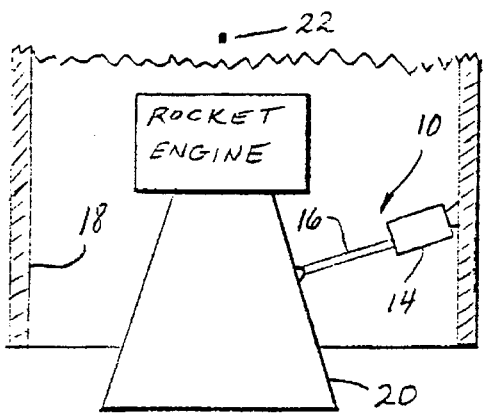
FIG. 1 shows a partial cross-section of a rocket and includes a schematic illustration of a conventional TVA system.
Figure 2:
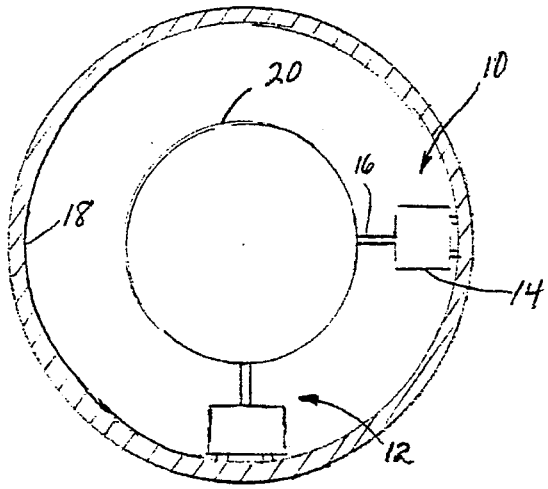
FIG. 2 is a schematic illustration of the conventional TVA system as seen from the direction indicated by the arrow in FIG. 1.
Figure 6:
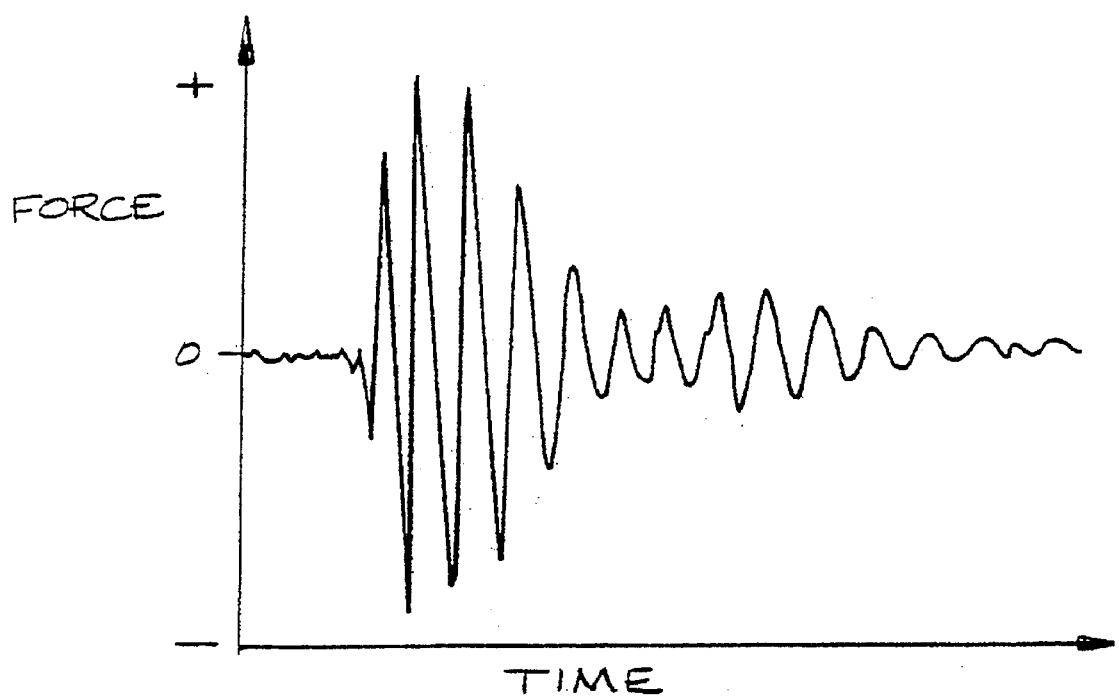
FIG. 6 is a graph which illustrates a typical transient load to which the TVA system may be subjected during engine startup or shutdown.

FIGS. 1 and 2 illustrate a TVA system according to the prior art. The system is comprised of two actuators 10, 12, each of which includes at least one motor (as at 14) connected in driving relation to an output shaft (as at 16). Each actuator is connected at one end to the outer structure 18 of the rocket, and at its opposite end, via the output shaft 16, to the rocket nozzle 20. The output shafts extend in mutually perpendicular directions so that the actuators can collectively position the nozzle 20 as needed to achieve the required thrust-vectoring, as directed by an electronic control system (not shown) in communication with the motors 14. The nozzle 20 is connected by unillustrated means to the outer structure 18, and is pivotable about a point indicated by the number 22. The TVA system is subjected to transient loads during engine startup and shutdown. The general form of these loads is illustrated in FIG. 6, and is characterized by initially high pulses of force which dampen over the course of several tenths of a second.

Figure 3:
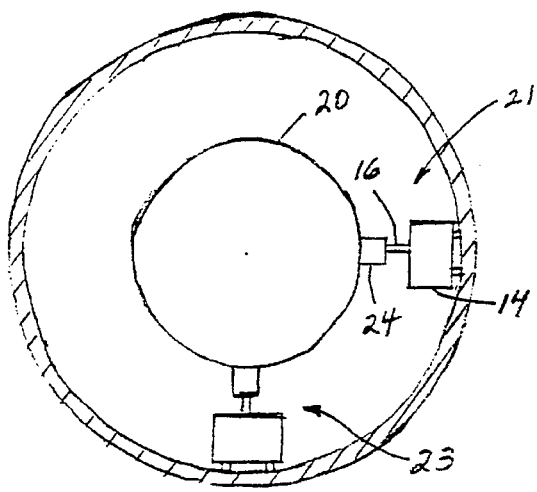
FIG. 3 is a schematic-illustration of a TVA system in accord with the invention.

Referring now to FIGS. 3–5, the TVA system of the present invention includes, for each of the actuators 21, 23, a shock-absorbing element 24 which is connected at one end to the output shaft 16 of the actuator, and at its opposite end to the rocket nozzle 20. As is more clearly illustrated in FIG. 4, each actuator is comprised of a bi-directional electric motor 14 connected through a gearbox 25 to a ball-screw type output shaft 16. The output shafts of the two actuators are extensible and retractable in mutually perpendicular directions. As best seen in FIG. 5, the output shaft 16 is threadedly engaged with a first end of an adaptor 26, which in turn is threadedly engaged at its opposite end with a cylindrical encasement 28. The encasement 28 contains a slidable rod 30, including a head portion 32, that is coaxial with the output shaft 16. Connected to the protruding head 32 is a rod-end bearing 34 that in use is connected to the nozzle 20 (FIG. 3). Threadedly engaged with the opposite end of the rod 30 is an adjustment collar 36 that is slidable along the bore 38 formed in the adaptor 26.- The adjustment collar 36 is used to set the pre-load on a die spring 40 which surrounds the rod 30. The spring 40 is captured between the adjustment collar 36 and the head 32.

Figure 7:
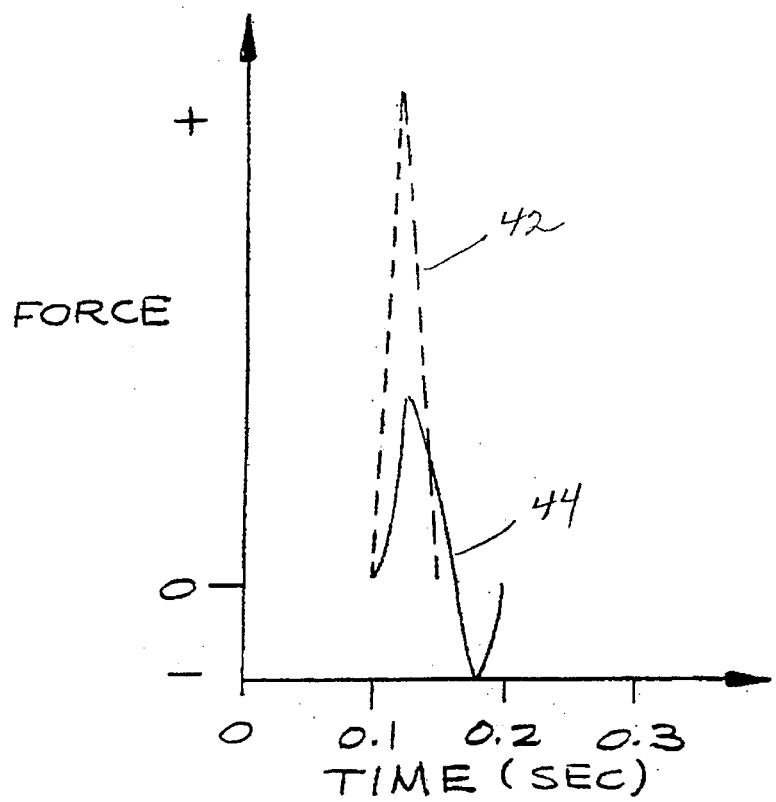
FIG. 7 is a comparative graph illustrating a single pulse of a transient load, both with and without the invention.

In use of the TVA system, the shock-absorbing elements are designed and pre-loaded so as to yield at a predetermined threshold force which is in excess of the forces experienced during normal operation. The actuators 21, 23 operate and are operated in a conventional manner. However, as is illustrated in FIG. 7 for a single pulse of the forementioned transient force (dashed line 42), the shock-absorbing elements 24 serve to substantially reduce the load experienced by the nozzle 20 (solid line 44), thus preventing damage to the nozzle and associated structure.

The foregoing portion of the description is intended as illustrative, and the required description of the preferred embodiment of the invention is not intended to limit the scope of the invention more than is indicated by the following claims.

What is claimed is:

1. Thrust-vectoring apparatus having a resiliently yieldable mount for positioning a rocket nozzle, comprising in combination:

a first bi-direction electric motor including a first output shaft connected to the nozzle; the shaft extending in a first direction;

a second bi-direction electric motor including a second output shaft connected to the nozzle; the shaft extending in a second direction perpendicular to the first direction;

said nozzle having an axis extending in the direction of primary thrust and being orthogonal with the first and second directions;

first shock-absorbing means connected proximate the nozzle and between the first shaft and the nozzle for permitting relative movement in response to transient force applied in the first direction; and second shock-absorbing means connected proximate the nozzle and between the second shaft and the nozzle for permitting relative movement in response to transient force applied in the second direction whereby the by the first and second shock-absorbing means compensate for compressive and expansive transient loads applied between the nozzle and actuator, thereby allowing the trust vectoring apparatus to continue to properly position the rocket nozzle after the transient has passed.

2. Apparatus as recited in claim 1 wherein each of the shock-absorption means comprises a die spring captured between its respective shaft and the nozzle.

3. Apparatus as recited in claim 1 further comprising first adaptor means for interconnecting the first shaft and the first shock-absorption means; and second adaptor means for interconnecting the second shaft and the second shock-absorption means.

4. Apparatus for positioning a rocket nozzle, comprising in combination:

an electric motor including an output shaft connected to the nozzle; and means, connected to the motor and nozzle and responsive to a transient force in excess of a predetermined threshold, for complying with the transient force to permit movement of the output shaft in a direction of decreased resistance to the force.

* * * * *